US008661005B2

(12) United States Patent  
McKenney et al.

(10) Patent No.: US 8,661,005 B2  
(45) Date of Patent: *Feb. 25, 2014

(54) OPTIMIZED DELETION AND INSERTION FOR HIGH-PERFORMANCE RESIZABLE RCU-PROTECTED HASH TABLES

(75) Inventors: Paul E. McKenney, Beaverton, OR (US); Joshua A. Triplett, Hillsboro, OR (US)

(73) Assignee: International Business Machines Corporation, Armonk, NY (US)

( * ) Notice: Subject to any disclaimer, the term of this patent is extended or adjusted under 35 U.S.C. 154(b) by 48 days.

This patent is subject to a terminal disclaimer.

(21) Appl. No.: 13/314,240

(22) Filed: Dec. 8, 2011

(65) Prior Publication Data

US 2013/0151489 A1 Jun. 13, 2013

(51) Int. Cl.  
*G06F 7/00* (2006.01)  
*G06F 17/00* (2006.01)  
*G06F 13/14* (2006.01)

(52) U.S. Cl.  
USPC .......................................................... 707/695

(58) Field of Classification Search  
USPC .......... 707/1/1, 693, 709, 800–801, 695, 731; 711/202, 221; 717/168  
See application file for complete search history.

(56) References Cited

U.S. PATENT DOCUMENTS

| 5,442,758 | A | 8/1995 | Slingwine et al. |
|---|---|---|---|
| 5,608,893 | A | 3/1997 | Slingwine et al. |
| 5,727,209 | A | 3/1998 | Slingwine et al. |
| 5,960,434 | A * | 9/1999 | Schimmel ............................. 1/1 |
| 6,219,690 | B1 | 4/2001 | Slingwine et al. |
| 6,662,184 | B1 | 12/2003 | Friedberg |
| 6,886,162 | B1 | 4/2005 | McKenney |
| 6,996,812 | B2 | 2/2006 | McKenney |
| 7,085,911 | B2 | 8/2006 | Sachedina et al. |
| 7,191,272 | B2 | 3/2007 | McKenney |
| 7,287,131 | B1 | 10/2007 | Martin et al. |
| 7,287,135 | B2 | 10/2007 | McKenney et al. |
| 7,313,555 | B2 | 12/2007 | Klier |
| 7,349,926 | B2 | 3/2008 | McKenney et al. |
| 7,353,346 | B2 | 4/2008 | McKenney et al. |
| 7,395,263 | B2 | 7/2008 | McKenney |

(Continued)

OTHER PUBLICATIONS

J. Seigh, "RCU+SMR for preemptive kernel/user threads," Linux Kernel Mailing List, May 9, 2005, 2 pages.

(Continued)

*Primary Examiner* — Usmaan Saeed  
*Assistant Examiner* — Cecile Vo  
(74) *Attorney, Agent, or Firm* — Walter W. Duft

(57) ABSTRACT

Concurrent resizing and modification of a first RCU-protected hash table includes allocating a second RCU-protected hash table, populating it by linking each hash bucket of the second hash table to all hash buckets of the first hash table containing elements that hash to the second hash table bucket, and publishing the second hash table. If the modifying comprises insertion, a new element is inserted at the head of a corresponding bucket in the second hash table. If the modifying comprises deletion, then within an RCU read-side critical section: (1) all pointers in hash buckets of the first and second hash tables that reference the element being deleted are removed or redirected, and (2) the element is freed following a grace period that protects reader references to the deleted element. The first table is freed from memory after awaiting a grace period that protects reader references to the first hash table.

12 Claims, 15 Drawing Sheets

(56) References Cited

U.S. PATENT DOCUMENTS

| | | | |
|---|---|---|---|
| 7,395,383 | B2 | 7/2008 | McKenney |
| 7,426,511 | B2 | 9/2008 | McKenney |
| 7,454,581 | B2 | 11/2008 | McKenney et al. |
| 7,472,228 | B2 | 12/2008 | McKenney et al. |
| 7,533,377 | B2 | 5/2009 | Appavoo et al. |
| 7,653,791 | B2 | 1/2010 | McKenney |
| 7,668,851 | B2 | 2/2010 | Triplett |
| 7,689,789 | B2 | 3/2010 | McKenney et al. |
| 7,734,879 | B2 | 6/2010 | McKenney et al. |
| 7,734,881 | B2 | 6/2010 | McKenney et al. |
| 7,747,805 | B2 | 6/2010 | McKenney |
| 7,809,916 | B1 | 10/2010 | Shavit et al. |
| 7,814,082 | B2 | 10/2010 | McKenney |
| 7,818,306 | B2 | 10/2010 | McKenney et al. |
| 7,873,612 | B2 | 1/2011 | McKenney et al. |
| 7,904,436 | B2 | 3/2011 | McKenney |
| 7,934,062 | B2 | 4/2011 | Mckenney et al. |
| 7,953,708 | B2 | 5/2011 | Mckenney et al. |
| 7,953,778 | B2 | 5/2011 | Mckenney et al. |
| 7,987,166 | B2 | 7/2011 | Mckenney et al. |
| 8,020,160 | B2 | 9/2011 | Mckenney |
| 8,055,860 | B2 | 11/2011 | Mckenney et al. |
| 8,055,918 | B2 | 11/2011 | Mckenney et al. |
| 2004/0083347 | A1 | 4/2004 | Parson |
| 2006/0112121 | A1 | 5/2006 | McKenney et al. |
| 2006/0117072 | A1 | 6/2006 | McKenney et al. |
| 2006/0130061 | A1 | 6/2006 | Bauer et al. |
| 2006/0265373 | A1 | 11/2006 | McKenney et al. |
| 2007/0061372 | A1 | 3/2007 | Appavoo et al. |
| 2008/0021908 | A1* | 1/2008 | Trask et al. ............ 707/100 |
| 2008/0082532 | A1 | 4/2008 | McKenney |
| 2008/0228691 | A1 | 9/2008 | Shavit et al. |
| 2008/0313238 | A1 | 12/2008 | McKenney et al. |
| 2009/0006403 | A1 | 1/2009 | McKenney |
| 2009/0077080 | A1 | 3/2009 | McKenney |
| 2010/0115235 | A1 | 5/2010 | Triplett |
| 2011/0055183 | A1 | 3/2011 | Mckenney |
| 2011/0283082 | A1* | 11/2011 | McKenney et al. ......... 711/202 |

OTHER PUBLICATIONS

M. Michael, "Hazard Pointers: Safe Memory Reclamation for Lock-Free Objects," IEEE Transactions on Parallel and Distributed Systems, Jun. 2004, vol. 15, No. 6, pp. 491-504.
D. Sarma et al., "Making RCU Safe for Deep Sub-Millisecond Response Realtime Applications," 2004 USENIX (UseLinux track) Jun. 2004, 9 pages.
P. McKenney, "RCU vs. Locking Performance on Different CPUs," 2004 Linux.conf.au, 2004, 18 pages.
P. McKenney et al., "Scaling dcache with RCU," Linux Journal, Jan. 1, 2004, 12 pages.
P. McKenney et al., "Using RCU in the Linux 2.5 Kernel," LInux Journal, Oct. 1, 2003, 11 pages.
P. McKenney et al.,"Read-Copy Update," 2002 Ottawa Linux Symposium, Jul. 8, 2002, 28 pages.
H. Lindar et al., "Scalability of the Directory Entry Cache," 2002 Ottawa Linux Symposium, Jun. 26, 2002, pp. 289-300.
P. McKenney et al., "Read-Copy Update," 2001 Ottawa Linux symposium, Jul. 2001, 22 pages.
P. McKenney et al., "Read-Copy Update: Using Execution History to Solve Concurrency Problems," PDCS, Oct. 1998, 11 pages.
S. Dietrich et al., "Evolution of Real-Time Linux," 7th RTL Workshop, Nov. 17, 2005, 18 pages.
B. Gamsa, "Tornado: Maximizing Locality and Concurrency in a Shared Memory Multiprocessor Operating System," 1999, 14 pages.
Molnar et al., "Realtime and Linux," 2005 Linux Kernel Summit, 8 pages.
H. Boehm, "The Space Cost of Lazy Reference Counting," ACM SIGPLAN Notices, Proceedings of the 31st ACM SIGPLAN-SIGACT Symposium on Principles of Programming Languages, POPL '04, vol. 39, Issue 1, Jan. 2004, p. 210-219.
M. Michael, "Scalable Lock-Free Dynamic Memory Allocation," ACM SIGPLAN Notices, Proceedings of the ACM SIGPLAN 2004 Conference on Programming Language Design and Implementation; PLDI '04, vol. 39, Issue 6, Jun. 2004, p. 35-46.
D. Dice et al., "Mostly Lock-Free Malloc," ACM SIGPLAN Notices, Proceedings of the 3rd International Symposium on Memory Management, ISMM '02, vol. 38, Issue 2 Supplement, Jun. 2002, p. 163-174.
J. Corbet, "Read-copy-update for realtime," LWN.net, Sep. 26, 2006, 3 pages.
McKenney, "Seven real-time Linux approaches (Part C)", LinuxDevices.com, Jun. 7, 2005, 13 pages.
P. McKenney, "RCU and CONFIG_PREEMPT_RT progress," Linux Kernel Mailing List, May 9, 2005, 2 pages.
O. Nesterov, QRCU: 'Quick' SRCU Implementation, Linux Kernel Mailing List, Dec. 1, 2005, 3 pages.
P. McKenney, "Sleepable RCU", LWN.net, Sep. 6, 2010, 10 pages.
P. McKenney, "Read-Copy Update Implementations", 2001, 3 pages.
M. Herlihy, "A Methodology for Implementing Highly Concurrent Data Objects," ACM Transactions on Programming Languages and Systems, vol. 15, Issue 5, Nov. 1993, pp. 745-770.
M. Michael, "Safe Memory Reclamation for Dynamic Lock-Free Objects Using Atomic Reads and Writes," Proceedings of the 21st Annual ACM Symposium on Principles of Distributed Computing, Jul. 2002, 10 pages.
N. Barghouti et al., "Concurrency Control in Advanced Database Operations," Jan. 1994, 83 pages.
P. McKenney, "Exploiting Deferred Destruction: An Analysis of Read-Copy-Update Techniques in Operating System Kernels," OGI School of School of Science & Engineering at Oregon Health & Science University, Jul. 2004, pp. 1-380.
P. McKenney et al., "Extending RCU for Realtime and Embedded Workloads," 2006 Ottawa Linux Symposium, Aug. 11, 2006, 15 pages.
P. McKenney, "The design of preemptible read-copy-update," LWN.net, Oct. 8, 2007, 27 pages.
P. McKenney, "Integrating and Validating dynticks and Preemptible RCU," LWN.net, Apr. 22, 2008, 19 pages.
P. McKenney, "Hierarchical RCU," LWN.net, Nov. 4, 2008, 19 pages.
P. McKenney, "Is Parallel Programming Hard, and, If so, What Can You Do About It", Mar. 8, 2009, 146 pages.
P. McKenney, "Priority-Boosting RCU Read-Side Critical Sections," LWN.net, Feb. 5, 2007, 15 pages.
P. McKenney et al., "Towards hard realtime response from the Linux kernel on SMP hardware," linux.conf.au, Canberra, Australia, Apr. 2005, 16 pages.
P. McKenney et al., "Exploiting Deferred Destruction: An Analysis of Read-Copy-Update Techniques in Operating System Kernels", Jan. 3, 2005, pp. 1-41.
D. Guniguntala et al., "The read-copy-update mechanism for supporting real-time applications on shared-memory multiprocessor systems with Linux", IBM Systems Journal vol. 47 No. 2, 2008, pp. 221-236.
P. McKenney, "Introducing Technology Into Linux", 2008 Linux Developer Symposium, China, 2008, 47 pages.
P. McKenney, "Simplicity Through Optimization", linux.conf.au, Jan. 2010, 109 pages.
P. McKenney, "Deterministic Synchronization in Multicore Systems: the Role of RCU", Aug. 18, 2009, pp. 1-9.
P. McKenney, "RCU cleanups and simplified preemptable RCU", LKML.org, Jul. 23, 2009, 1 page.
P. McKenney, "Expedited "big hammer" Rcu grace periods", LKML.org, Jun. 25, 2009, 2 pages.
P. McKenney, "RCU: The Bloatwatch Edition", LWN.net, Mar. 17, 2009, 9 pages.
M. Desnoyers, "Low-Impact Operating System Tracing", University of Montreal, PhD Thesis, Dec. 2009, 233 pages.
P. McKenney, "Using a Malicious User-Level RCU to Torture RCU-Based Algorithms", linux.conf.au, Jan. 2009, 51 pages.
P. McKenney et al., "Introducing Technology Into the Linux Kernel: A Case Study", Operating Systems Review, Jul. 2008, 16 pages.

(56) References Cited

OTHER PUBLICATIONS

P. McKenney, "What is RCU, Fundamentally", LWN.net, Dec. 17, 2007, 15 pages.

P. McKenney, What is RCU? Part 2: Usage, LWN.net, Dec. 24, 2007, 15 pages.

P. McKenney, RCU part 3: the RCU API, LWN.net, Jan. 7, 2008, 7 pages.

T. Hart et al., "Performance of memory reclamation for lockless synchronization", Journal of Parallel and Distributed Computing, Dec. 2007, pp. 1270-1285.

McKenney, "Using Promela and Spin to verify parallel algorithms", LWN.net, Aug. 1, 2007, 11 pages.

McKenney, "RCU and Unloadable Modules", LWN.net, Jan. 14, 2007, 4 pages.

P. Zijlstra, "[Patch] slab: document SLAB_DESTROY_BY_RCU", LKML.org, Nov. 13, 2008, 1 page.

A. Arcangeli et al., "Using Read-Copy-Update Techniques for System V IPC in the Linux 2.5 Kernel," 2003 Freenix, Jun. 14, 2003, 13 pages.

P. McKenney, "The RCU API, 2010 Edition", LWN.net, Dec. 8, 2010, 11 pages.

O. Shalev et al., "Split-Ordered Lists: Lock-Free Extensible Hash Tables", Journal of the ACM, vol. 53, No. 3, 2006, pp. 379-405.

Anonymous, "A Method for Implementing a Lock-Free Hash Table", ip.com/priorartdatabase.com/ IPCOM000205877D, Apr. 6, 2011, pages.

M. Jensen et al. "Optimality in external memory hashing", Algorithmica, vol. 52, No. 3, 403-311, Nov. 2008, 1 page abstract.

J. Appavoo, "Clustered Objects", University of Toronto Ph.D Thesis, 2005, 176 pages.

* cited by examiner

OPTIMIZED DELETION AND INSERTION FOR HIGH-PERFORMANCE RESIZABLE RCU-PROTECTED HASH TABLES

BACKGROUND

1. Field

The present disclosure relates to hash table data structures. More particularly, the disclosure concerns adaptive hash table resizing and modifying for hash tables that support concurrent access by readers and writers using the read-copy update synchronization mechanism.

2. Description of the Prior Art

By way of background, hash tables provide useful data structures for many applications, with various convenient properties such as constant average time for accesses and modifications. When a hash table is shared for reading and writing by concurrent applications, a suitable synchronization mechanism is required to maintain internal consistency. One technique for supporting concurrent hash table access comes in the form of Read-Copy Update (RCU). RCU is a synchronization mechanism with very low overhead for readers, and thus works particularly well for data structures with significantly more reads than writes, such as hash tables. These properties allow RCU-protected hash tables to scale well to many threads on many processors.

RCU-protected hash tables are implemented using open chaining, with RCU-protected linked lists being provided for the hash buckets. Readers traverse these linked lists without using locks, atomic operations or other forms of mutual exclusion. Writers performing updates to hash table elements protect the readers by waiting for a grace period to elapse before freeing any stale data that the readers may have been referencing.

A challenge respecting RCU-protected hash tables is the need to support efficient hash table resizing. The ability to dynamically resize a hash table stems from the fact that the performance and suitability of hash tables depend heavily on choosing the appropriate size for the table. Making a hash table too small will lead to excessively long hash chains and poor performance. Making a hash table too large will consume too much memory, reducing the memory available for other applications or performance-improving caches, and increasing hardware requirements. Many systems and applications cannot know the proper size of a hash table in advance. Software designed for use on a wide range of system configurations with varying needs may not have the option of choosing a single hash table size suitable for all supported system configurations. Furthermore, the needs of a system may change at run time due to numerous factors, and software must scale both up and down dynamically to meet these needs. For example, in a system that supports virtual computing environments, the ability to shrink a hash table can be particularly important so that memory can be reallocated from one virtual environment to another.

Resizing an RCU-protected hash table so as to either increase or decrease the hash table size results in hash buckets being respectively added to or removed from the hash table, with a corresponding change being made to the hash function. This usually entails one or more hash table elements having to be relocated to a different hash bucket, which can be disruptive to readers if care is not taken to protect their operations during the resizing operation. Existing RCU-protected hash tables support reader-friendly hash table resizing using several approaches. However, there are shortcomings that are variously associated with these approaches, such as (1) the need to maintain duplicate sets of per-element list links, thereby increasing the hash table memory foot print, (2) the need to incur large numbers of grace period delays and require readers to search two hash table versions during resizing, and (3) the need to copy data hash table elements, which makes it difficult or impossible for readers to maintain long-lived references to such elements. The present disclosure presents a new technique that enables optimized resizing of RCU-protected hash tables while permitting concurrent read access without any of the above deficiencies, and also while permitting insertion and deletion operations to proceed during resizing.

SUMMARY

A method, system and computer program product are provided for concurrently resizing and modifying an RCU-protected hash table stored in a memory. According to the disclosed technique, a second RCU-protected hash table is allocated in the memory. The second hash table represents a resized version of said first hash table that has a different number of hash buckets than the first hash table, the second hash table buckets being defined but initially having no hash table elements. The second hash table is populated by linking each hash bucket of the second hash table to all hash buckets of the first hash table containing elements that hash to the second hash bucket. The second hash table is then published so that it is available for searching by hash table readers. If the modifying comprises inserting a new hash table element, the element is inserted at the head of a corresponding bucket in the second hash table. If the modifying comprises deleting an existing hash table element, an RCU read-side critical section is entered, all pointers in one or more hash buckets of the first hash table and the second hash table that reference the existing hash table element are removed or redirected, the RCU read-side critical section is exited, and the existing hash table element is freed from memory after waiting for a grace period which guarantees that no readers searching the first hash table or the second hash table will be referencing the existing hash table element. The first hash table is freed from memory after waiting for a grace period which guarantees that no readers searching the first hash table will be affected by the freeing.

In an embodiment, the modifying includes first determining whether resizing is underway, and if not, performing the modifying on the first hash table only. Determining whether resizing is underway may be performed after acquiring a lock on a hash bucket in the first hash table where the modifying is to be performed, and releasing the first lock if resizing is determined to be underway. If the modifying comprises inserting a new hash table element, a lock may be acquired on a hash bucket in the second hash table where the inserting is to be performed. If the modifying comprises deleting an existing hash table element, locks may be acquired on all hash buckets in the first hash table and the second hash table where the pointer removing or redirecting is to be performed. The modifying may further include performing an action to prevent starvation by successive resizing invocations.

BRIEF DESCRIPTION OF THE DRAWINGS

The foregoing and other features and advantages will be apparent from the following more particular description of example embodiments, as illustrated in the accompanying Drawings, in which.

DETAILED DESCRIPTION OF EXAMPLE EMBODIMENTS

Introduction

Figure 1:
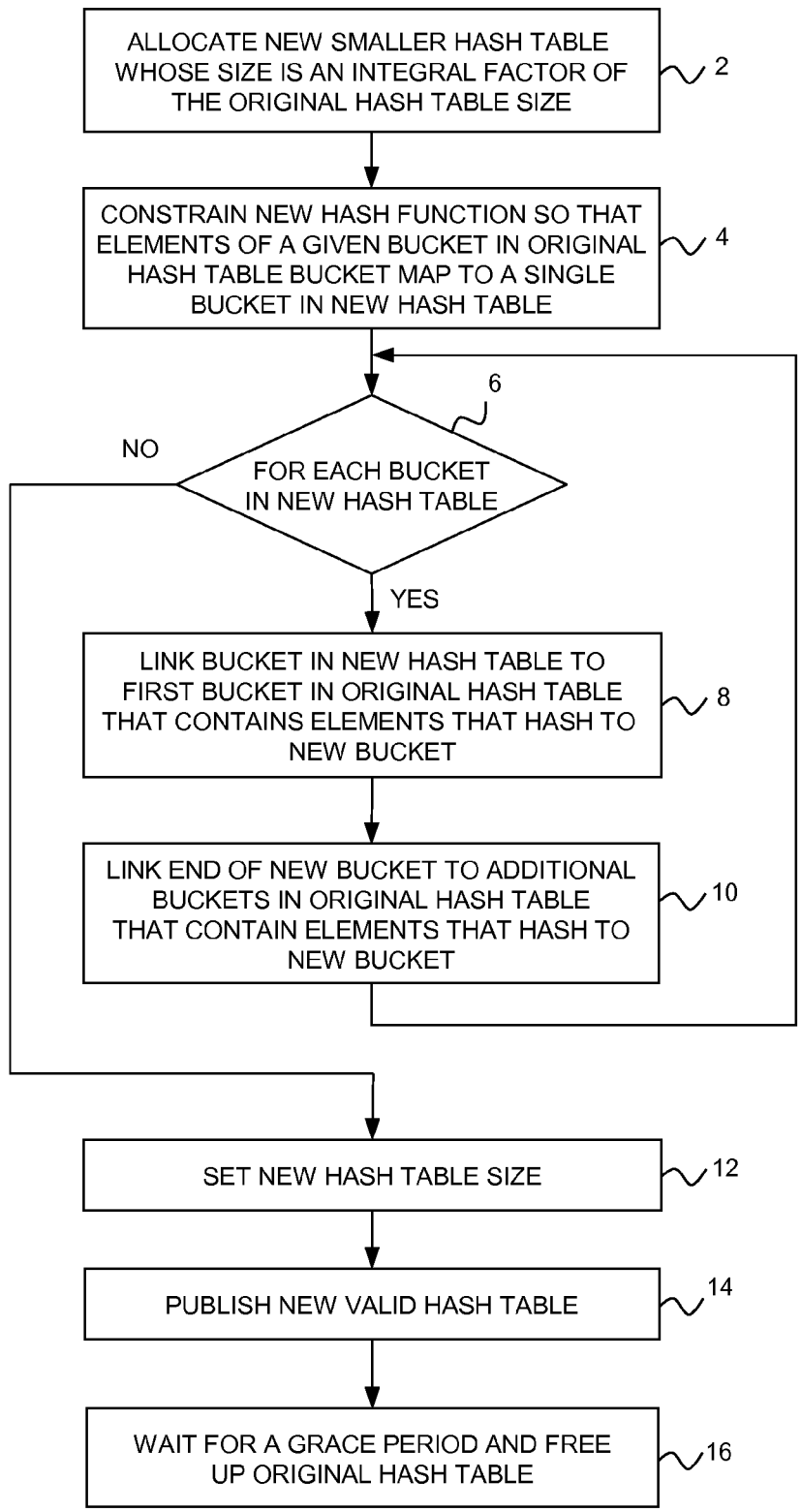
FIG. 1 is a flow diagram showing a first example embodiment for resizing an RCU-protected hash table by shrinking the table.

Example embodiments will now be described for dynamically resizing RCU-protected hash tables in a manner that supports optimized deletion and insertion of hash table elements during a resizing operation. The RCU-protected hash table resizing technique disclosed herein offers the following advantages:

(1) Hash table elements need not be copied during a resize operation, thereby avoiding expansion of the read-side cache footprint while still allowing long-lived references to any given element;
(2) Readers need only search a single hash chain, even during a resize operation;
(3) An expanding resize operation can handle multiple items per RCU grace period in order to minimize the number of RCU grace periods required;
(4) Each hash table element need only maintain one set of list pointers; and
(5) Insertion and deletion operations may proceed during a resizing operation.

In order to achieve these benefits, an approach is taken wherein any resizing-induced changes to the hash function are restricted so that a given hash bucket in the hash table prior to resizing will map to a predictable bucket or set of buckets in the hash table subsequent to resizing. This restriction allows a hash table to be resized using cross-inking operations in which the hash table elements are neither copied nor moved around in memory. Instead, resizing occurs in an incremental fashion so that readers see consistent hash bucket lists with all applicable hash table elements at all times. The approach waits for grace periods between certain steps of the resizing operation in order to guarantee that readers see a sufficiently consistent view of the hash table. Using the disclosed technique, shrinking a hash table requires only a single grace period. Enlarging a hash table requires only a limited number of grace periods that does not exceed the number of hash table elements in the longest hash chain.

In both cases, a new resized hash table is created and co-exists with the original hash table during the resizing operation. The insertion of a hash table element during a resizing operation can be handled by adding the element at the head of the corresponding bucket that the element hashes to in the new hash table. The deletion of a hash table element can be handled by removing all links to the affected element in the corresponding buckets that the element hashes to in both the original and new hash tables. The deletion operation is performed within an RCU read-side critical section in order to guarantee the continued existence of the original hash table and also to avoid being starved by a closely-spaced sequence of resize operations. The insertion operation does not need to be performed within an RCU read-side critical section, but may benefit from doing so if starvation of the insertion operation due to closely-spaced resizing operations is a concern. Per-bucket locks are obtained when both inserting or deleting elements in a given hash bucket.

Resizing an RCU-Protected Hash Table by Shrinking

Figure 2A:
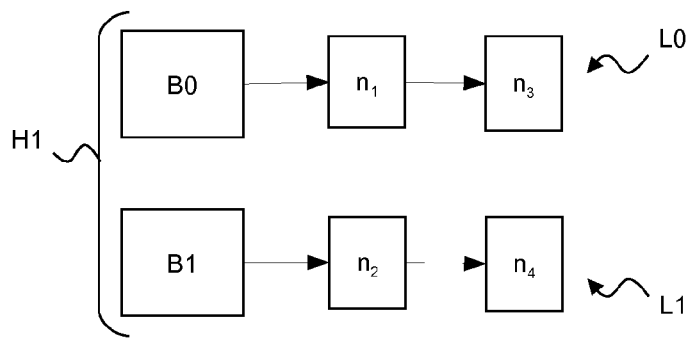
FIGS. 2A-2G are diagrammatic representations showing successive stages of an example implementation of the hash table resizing operations of FIG. 1.

To shrink an RCU-protected hash table, an updater may perform the example operations 2-16 shown in FIG. 1. These operations will be described using an example RCU-protected hash table H1 shown in FIG. 2A. The hash table H1 initially has two hash buckets B0 and B1. Hash bucket B0 comprises an RCU-protected linked list L0 containing two odd-numbered elements $n_1$ and $n_3$. Hash bucket B1 comprises an RCU-protected linked list L1 containing two even-numbered elements $n_2$ and $n_4$. In this example, the hash table H1 will be shrunk by an integral factor of two so as to produce a new resized hash table H2 having only a single hash bucket B-all containing all of the elements $n_1$, $n_2$, $n_3$ and $n_4$ (see FIG. 2G).

Figure 2B:
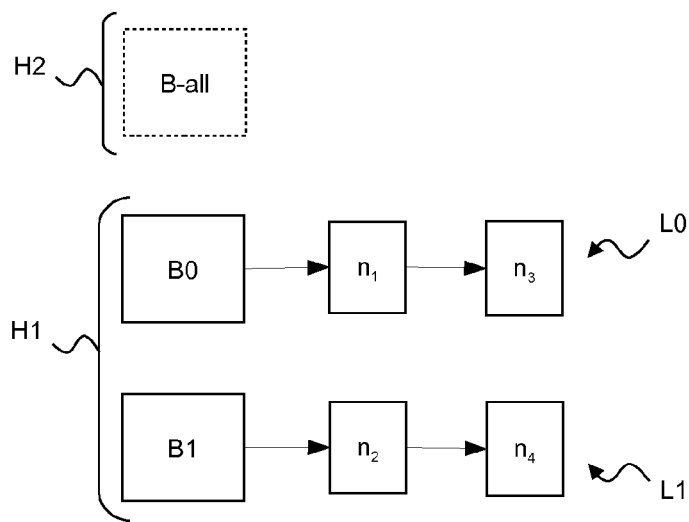

As shown in block 2 of FIG. 1, and with additional reference to FIG. 2B, the updater performing the resizing operation allocates the new smaller hash table H2 representing a resized version of the original hash table H1 having the new hash bucket B-all. When the new hash table H2 is first allocated, the hash bucket B-all is defined but has no hash table elements linked thereto. In block 4 of FIG. 1, a new hash function is created but is constrained so that all the elements of a given bucket in the original hash table H1 map to a single bucket in the new hash table H2. This can be accomplished by applying a different modulus to the same hash function. For example, the original modulus may be the number of hash buckets in the original table H1 and the new modulus may be the number of hash buckets in the new hash table H2. Block 6 of FIG. 1 iterates on blocks 8 and 10 for each bucket in the new hash table H2.

Figure 2C:
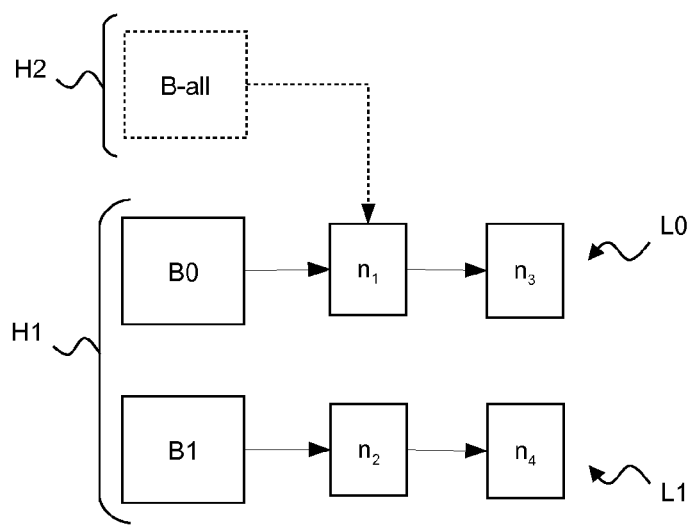
Figure 2D:
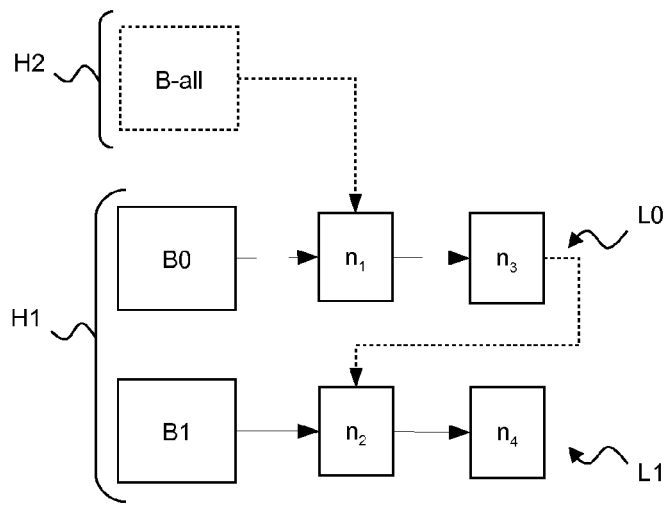

As shown in block 8 of FIG. 1, and with additional reference to FIG. 2C, the new hash table H2 is now populated with hash table elements. This is initiated by linking the new hash bucket B-all in the new hash table H2 to the first hash bucket in the original hash table H1 that contains elements that will hash to the new bucket. In the present example, this is the old hash bucket B0. As shown in block 10 of FIG. 1, and with additional reference to FIG. 2D, the end of the new hash bucket B-all in the new hash table H2 is now linked to the next hash bucket in the original hash table H1 that contains elements that will hash to the new bucket. In the present example, this is the old hash bucket B1. If there were additional hash buckets in the new hash table H2 that contained mapping elements, such buckets would also be successively linked. In this way, the new hash bucket B-all will be chained through all hash buckets of the original hash table H1 whose elements map to the new bucket. In some cases, such chaining may only entail a single hash bucket of the original hash table. In other cases, the chaining will involve different (e.g., two or more) hash buckets of the original hash table (as in the present example). This completes the operations of blocks 6-10 for the present example.

Figure 2E:
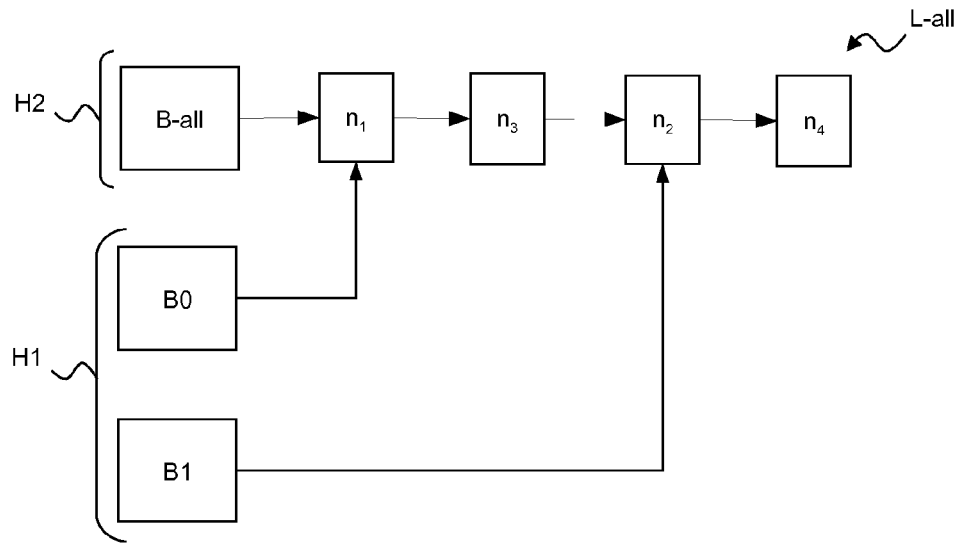
Figure 2F:
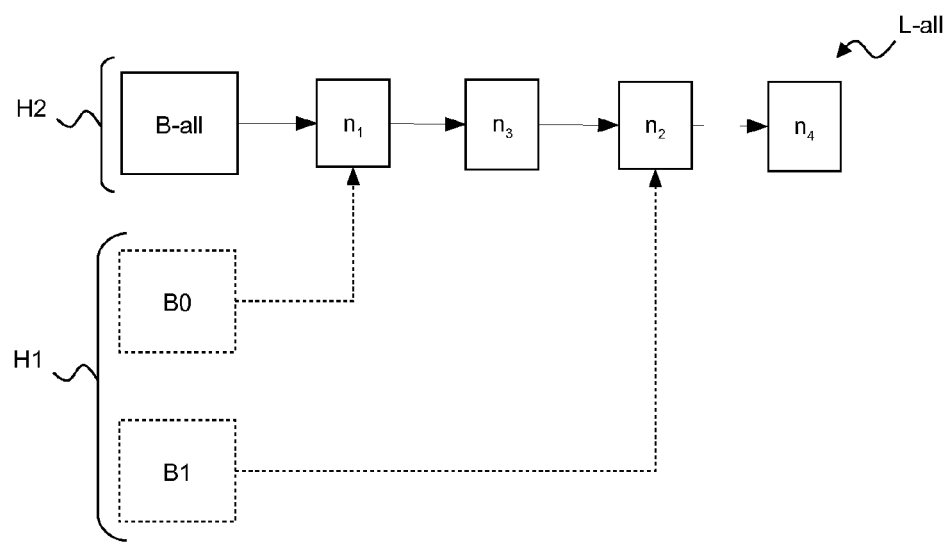
Figure 2G:
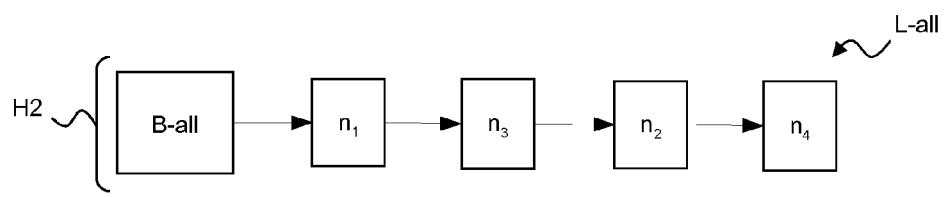

At this point, if a reader were to access the new hash table H2, it would find all of the elements of the original hash table H1. It is therefore safe to set the size of the new hash table H2 and publish it as a valid hash table that replaces the original hash table H1 (e.g., using the rcu_assign_pointer( ) primitive). These operations are shown in blocks 12 and 14 of FIG. 1, and the resultant state is shown in FIG. 2E. Note that any reader that accessed the original hash table H1 prior to the new hash table H2 being published will also be able to find all of the original hash able elements. In block 16 of FIG. 1, the updater waits for a grace period that guarantees all readers will now see the new hash table H2 (e.g., using a primitive such as synchronize_rcu( ) or synchronize_rcu_expedited( )), then frees the original hash table from memory. FIG. 2F illustrates the hash table state following the grace period in which buckets B0 and B1 of the original hash table H1 are no longer valid. FIG. 2G illustrates the final hash table state in which the original hash table H1 has been freed from memory and only the new hash table H2 remains.

Resizing an RCU-Protected Hash Table by Expanding

Figure 3A:
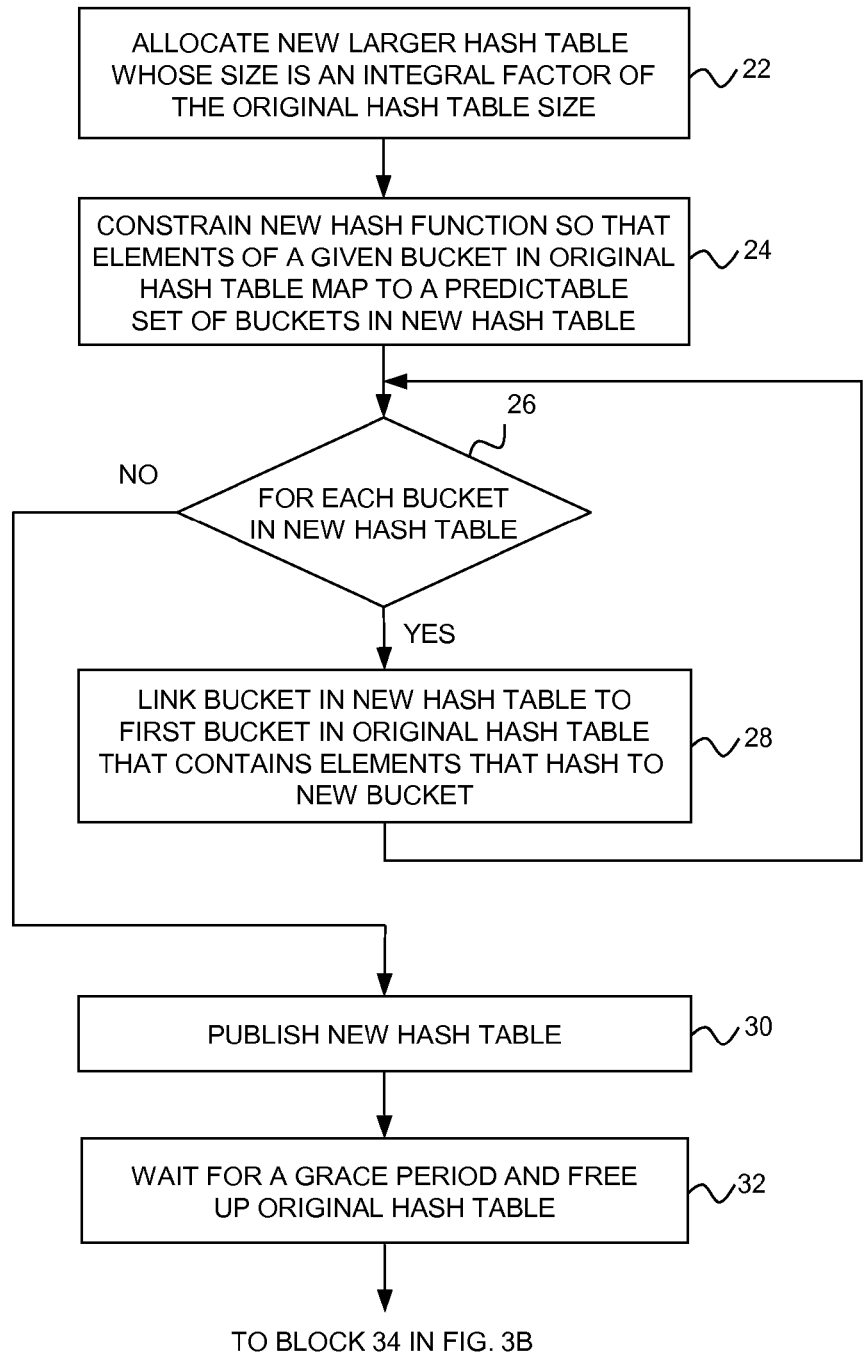
FIGS. 3A-3B are two parts of a single flow diagram showing a second example embodiment for resizing an RCU-protected hash table by expanding the table.
Figure 3B:
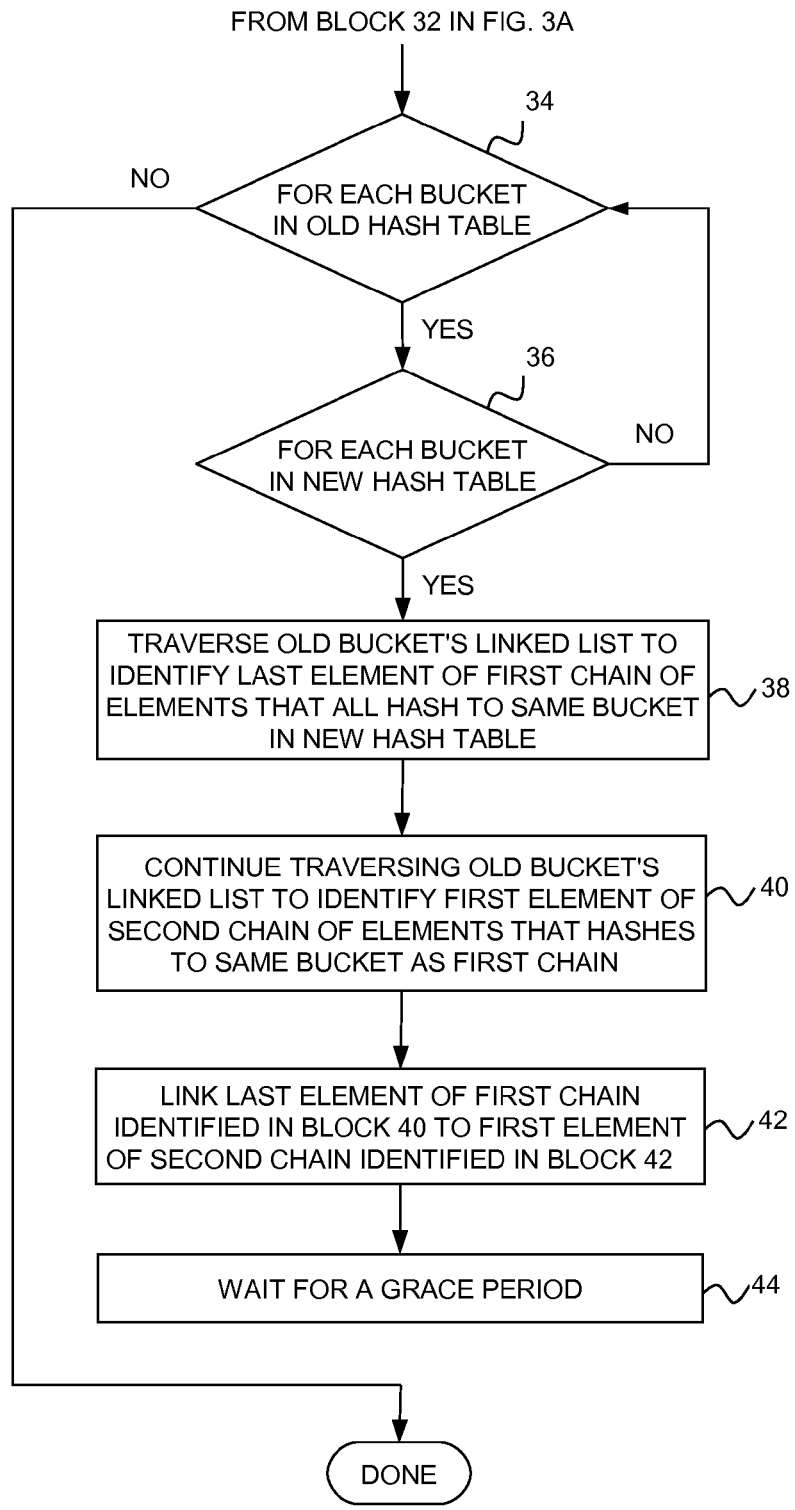
Figure 4A:
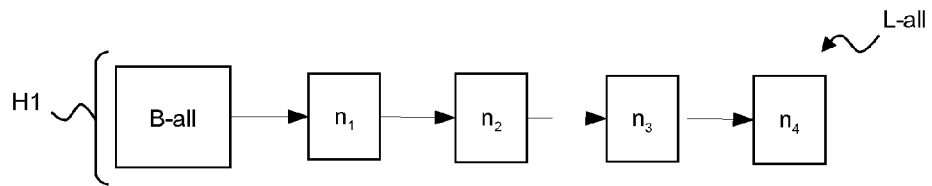
FIGS. 4A-4H are diagrammatic representations showing successive stages of an example implementation of the hash table resizing operations of FIGS. 3A-3B.

To expand an RCU-protected hash table, an updater may perform the example operations 20-44 shown in FIGS. 3A-3B. These operations will be described using an example RCU-protected hash table H1 shown in FIG. 4A. The hash table H1 has a single bucket B-all comprising an RCU-protected linked list L-all with two odd-numbered elements $n_1$ and $n_3$ and two even-numbered elements $n_2$ and $n_4$. In this example, the hash table H1 will be expanded by an integral factor of two so as to produce a new resized hash table H2 having two hash buckets B0 and B1, with B0 containing the two odd-numbered elements $n_1$ and $n_3$, and B1 containing the two even-numbered elements $n_2$ and $n_4$ (see FIG. 4H).

Figure 4B:
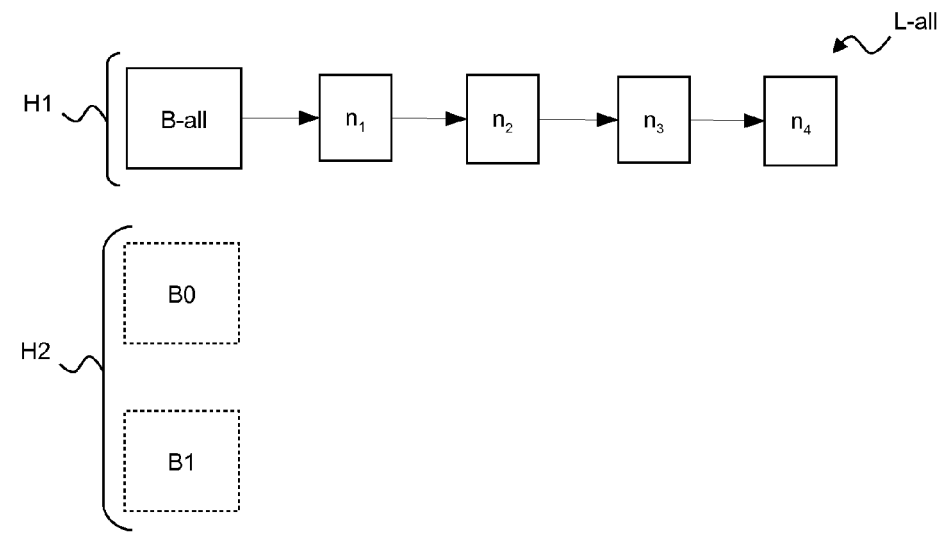

As shown in block 22 of FIG. 3A, and with additional reference to FIG. 4B, the updater performing the resizing operation allocates the new larger hash table H2 representing a resized version of the original hash table that has the two new hash buckets B0 and B1. When the new hash table H2 is first allocated, the hash buckets B0 and B1 are defined but have no hash table elements linked thereto. In block 24 of FIG. 3A, a new hash function is created but is constrained so that all the elements of a given bucket in the original hash table H1 map to a predictable set of buckets in the new hash table H2. This can be accomplished by applying a different modulus to the same hash function. For example, the original modulus may be the number of hash buckets in the original table H1 and the new modulus may be the number of hash buckets in the new hash table H2. Block 26 of FIG. 3A iterates on block 28 for each bucket in the new hash table H2.

Figure 4C:
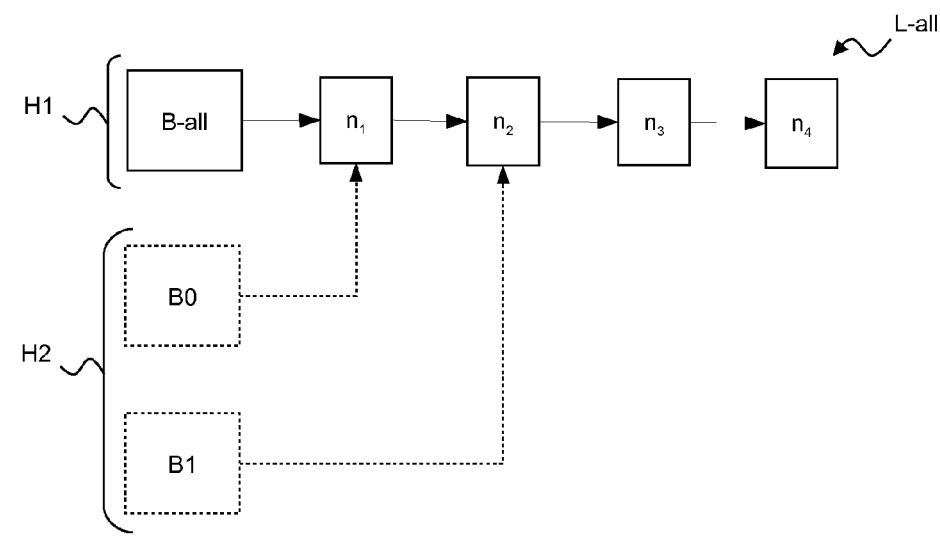
Figure 4D:
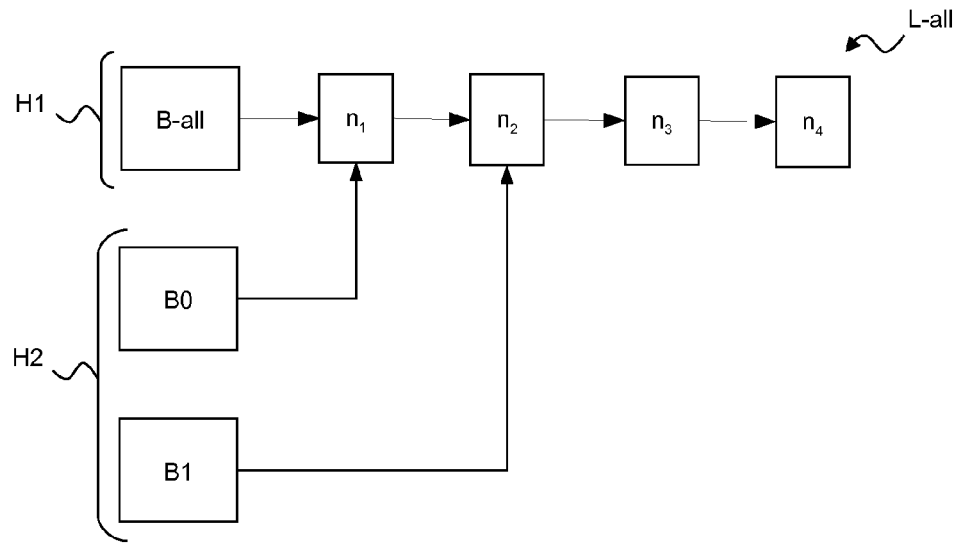
Figure 4E:
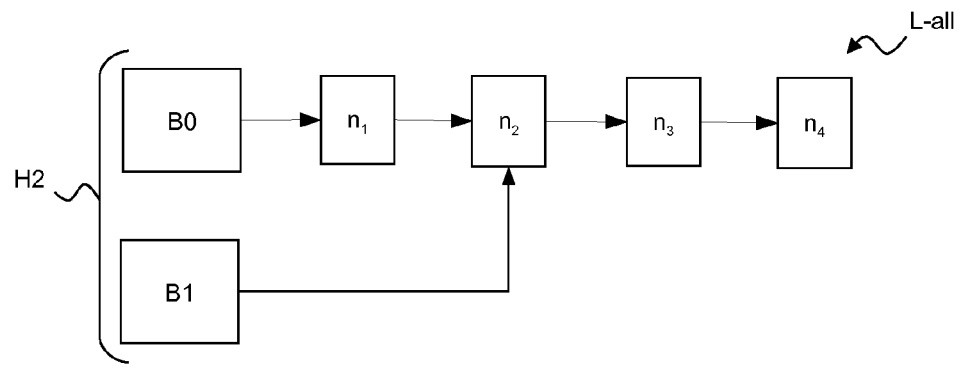

As shown in block 28 of FIG. 3A, the new hash table H2 is now populated with hash table elements. This is initiated by linking each hash bucket of the new hash table H2 to a hash bucket in the original hash table H1 that contains elements that will hash to the new bucket. After two passes through block 28, new hash bucket B0 will be linked to element $n_1$ in old hash bucket B-all and hash bucket B1 will be linked to element $n_2$ in hash bucket B-all. See FIG. 4C. The linking of two hash buckets in the new hash table H2 to a single hash bucket in the original hash table H1 is due to the original hash bucket containing elements that map to different hash buckets in the new hash table H2. This completes the operations of blocks 26-28 for the present example. At this point, because all of the elements that will end up in the new hash buckets B0 and B1 appear in the original bucket B-all, the hash table H2 represents an entirely new valid hash table, but with the new buckets being interleaved or "zipped" together in a single imprecise chain. This means that the new hash table H2 can be published (e.g., using the rcu_assign_pointer( ) primitive) as per block 30 of FIG. 3A and as shown in FIG. 4D. New readers will use the new table H2 even though older readers may still be using the old table H1. Insofar as is now desirable to remove the original hash table H1, block 32 of FIG. 3A waits for a grace period (e.g., using a primitive such as synchronize_rcu( ) or synchronize_rcu_expedited( )) and then frees the original hash table from memory. The resultant state in which only the new hash table H2 remains is shown in FIG. 4E.

Figure 4F:
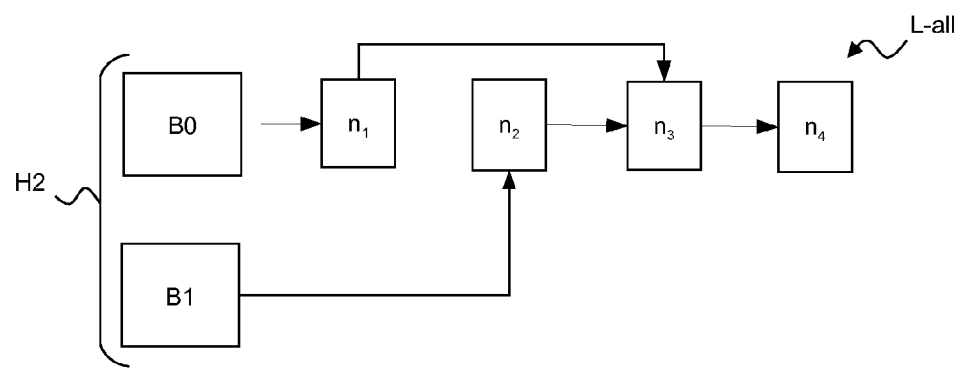

Blocks 34-44 of FIG. 3B may now be performed to separate or "unzip" the interleaved hash buckets B0 and B1 in the new hash table H2 into separate RCU-protected linked lists. As will now be described, this is handled by successively changing links from hash table elements in the linked list L-all representing the old hash bucket B-all to point to the next element in the linked list that hashes to the same new bucket B0 or B1. Grace periods are implemented as necessary to protect readers from the effects of the link changes. Block 34 of FIG. 3B iterates on blocks 36-44 for each hash bucket in the original hash table H1. In the present example, bucket B-all is the only such bucket. It contain elements that are destined for different hash buckets in the new hash table H2, namely, buckets B0 and B1. Block 36 of FIG. 3B iterates on blocks 38-44 for each hash bucket in the new hash table H2. In block 38 of FIG. 3B, the RCU-protected linked list of a bucket in the original hash table H1 (i.e., the linked list L-all in FIG. 4E) is traversed to identify a chain of hash table elements that all hash to the same bucket in the new hash table H2. The end of this chain will be the immediate predecessor of the first hash table element that does not hash to the same bucket in the new hash table H2. In FIG. 4E, the first element $n_1$ of the linked list L-all represents the last element of a first chain (comprising but a single element) that hashes to bucket B0 in the new hash table H2. In block 40 of FIG. 3B, the linked list of the same hash bucket in the original hash table H1 (i.e., the linked list L-all in FIG. 4E) is again traversed, starting from the element $n_1$ identified in block 40, to find the next element (if any) that hashes to the same hash bucket in the new hash table H2 as the previously identified chain (i.e., bucket B0 in this example). In FIG. 4E, this is the third element $n_3$. In block 42 of FIG. 3B, the first element identified in block 38 is linked to the second element identified in block 40. The result of this operation for the present example is to link element $n_1$ to element $n_3$, as shown in FIG. 4F. If there was no second element identified in block 40, the first element in block 38 would be given a pointer that represents a bucket-ending sentinel value (e.g., a NULL pointer).

Before reiterating blocks 38-42 with respect to the next bucket in the new hash table H2 (per block 36), block 44 waits for a grace period (e.g., by calling a primitive such as synchronize_rcu( ) or synchronize_rcu_expedited( )). The grace period is needed because the next iteration will link element $n_2$ to element $n_4$, thereby removing the existing link from element $n_2$ to element $n_3$. Without the grace period, a reader that is referencing element $n_2$ but searching for odd-numbered hash table elements would be unable to continue its search when element $n_2$ is relinked from element $n_3$ to element $n_4$.

Figure 4G:
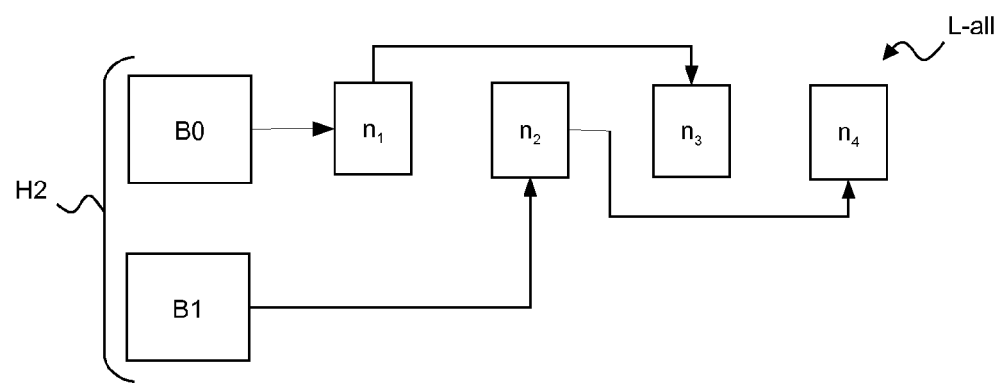
Figure 4H:
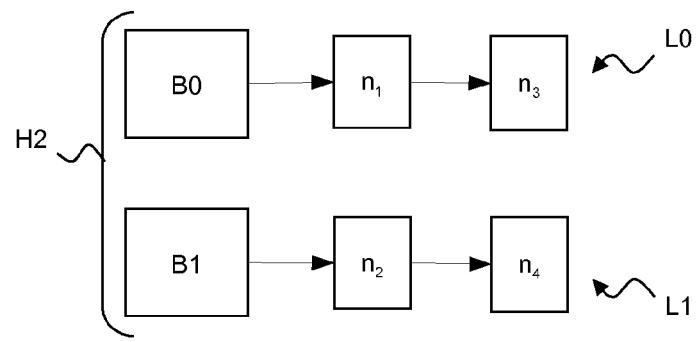

FIG. 4F shows the result of iterating on blocks 38-44 of FIG. 3B for the first bucket B0 of the new hash table H2. FIG. 4G shows the result of iterating on blocks 38-44 for the second bucket B1 of the new hash table H2. If there were additional elements of the original bucket B-all, the same processing would be performed until all of the elements of that bucket are linked into their respective buckets in the new hash table H2 (i.e., buckets B0 and B1). FIG. 4H shows the resultant new hash table H2, with hash bucket B0 comprising a linked list L0 and hash bucket B1 comprising a linked list L1.

Insertion while Resizing an RCU-Protected Hash Table

Figure 5:
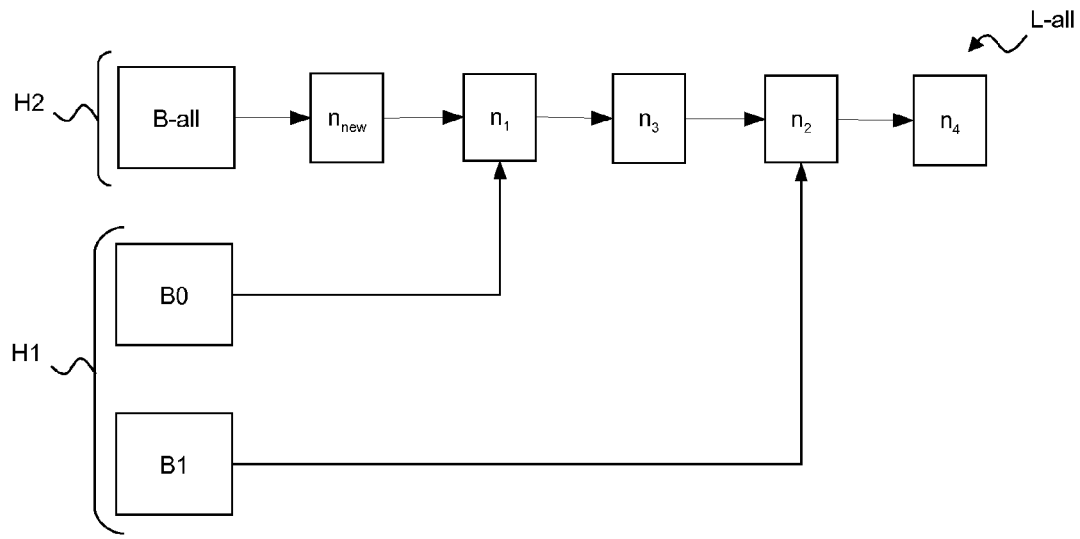
FIG. 5 is a diagrammatic representation showing the effects of a hash table element insertion operation in a hash table undergoing resizing by shrinking.
Figure 6:
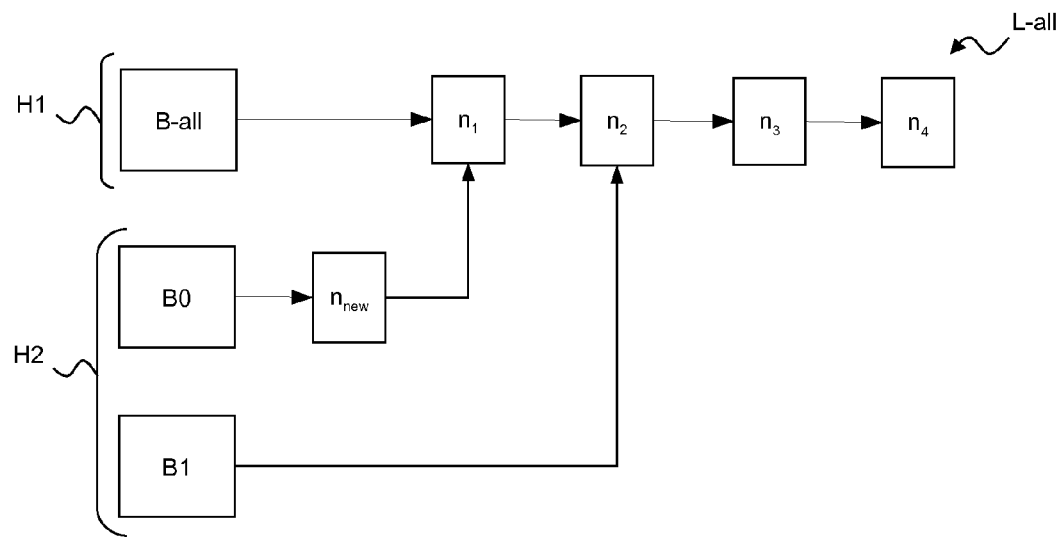
FIG. 6 is a diagrammatic representation showing the effects of a hash table element insertion operation in a hash table undergoing resizing by enlarging.

Inserting a hash table element while resizing a hash table using the above resizing techniques can be handled by inserting at the head of the corresponding bucket that the element hashes to in the new hash table. This presumes that the new hash table has reached the stage of being published. When shrinking a hash table, publication of the new hash table occurs in block 14 of FIG. 1. FIG. 2E illustrates this state with respect to a new hash table H2 having a single hash bucket B-all. FIG. 5 shows what the hash table H2 in FIG. 2E would look like after a new element $n_{new}$ is inserted at the head of the B-all bucket. Note that readers who began their searches on the original hash table H1 would not see the new element $n_{new}$ unless their searches were retried and the new hash table H2 was found. However, this scenario is acceptable for typical RCU read-side critical sections. When expanding a hash table, publication of the new hash table occurs in block 30 of FIG. 3A. FIG. 4D illustrates this state with respect to a new hash table H2 having two hash buckets B0 and B1. FIG. 6 shows what the hash table H2 in FIG. 4D would look like after a new element $n_{new}$ is inserted at the head of the B0 bucket. As in the example of FIG. 5, readers that began their searches on the original hash table H1 would not see the new element $n_{new}$ unless their searches were retried and the new hash table H2 was found. Again however, this scenario is acceptable for typical RCU read-side critical sections. An insertion operation can be protected against concurrent insertion (or deletion) operations by a per-bucket lock. However, the insertion operation needs to be able to determine when a resizing operation is in effect so that it knows which hash table is to receive the insertion.

One approach is to have the insertion operation check a per-bucket flag that indicates whether or not resizing is underway. This flag would be set on the hash buckets of the original hash table by the resizing operation. The resizing operation may use per-bucket resizing locks to synchronize with other resizing operations, with each bucket involved in a resizing operation being locked prior to that bucket being processed. In that case, the per-bucket flags could be set as each bucket's resizing lock is acquired. A global flag on the hash table itself could also be used in lieu of per-bucket flags. A second approach that may also be combined with per-bucket locking during resizing operations is to have a global integer that indicates the largest-index bucket of the original hash table whose resizing locked has been acquired by a resizing operation. This index can be incremented to reference a given bucket only if the bucket's resizing lock is held. The insertion operation would first obtain an insertion lock on a bucket in the original hash table and check the global integer. If the global integer is less than the bucket's index, the resizing operation has not yet processed the bucket and the new hash table element is therefore inserted at the head of the corresponding bucket of the original hash table. Otherwise, the new hash table element is inserted at the head of the corresponding bucket of the new hash table. A third approach checks the pointers that have been assigned to the original and new hash tables. If both pointers are non-NULL, then resizing is in progress. Note that only one of these pointers need be used by readers searching the hash table.

In all of the foregoing approaches, if a hash table element is to be inserted in the new hash table, the insertion lock for the old hash table's corresponding bucket is dropped and that of the new hash table's bucket is acquired. It may then be desirable to recheck to see if a new resize operation has started in the meantime. If a given insertion operation collides with too many different resize operations, the insertion operation can avoid starvation by acquiring the per-bucket resizing lock used by resizing operations. Alternatively, starvation of the insertion operation can be avoided by performing the insertion operation within an RCU read-side critical section. Because each resizing operation contains at least one wait for a grace period, no more than one resizing operation can complete concurrently with such an insertion. Nevertheless, it still may be desirable to recheck after acquiring a new hash table's bucket lock. For example, if the final grace period of the resizing operation is performed after dropping the resizing lock, it is possible that the next resizing operation has proceeded far enough to require switching again to the next new hash table version. Although the resizing of a hash table multiple times in quick succession may be somewhat unlikely, such operations could result from repeated insertion and deletion operations being performed in a short time span.

Figure 7:
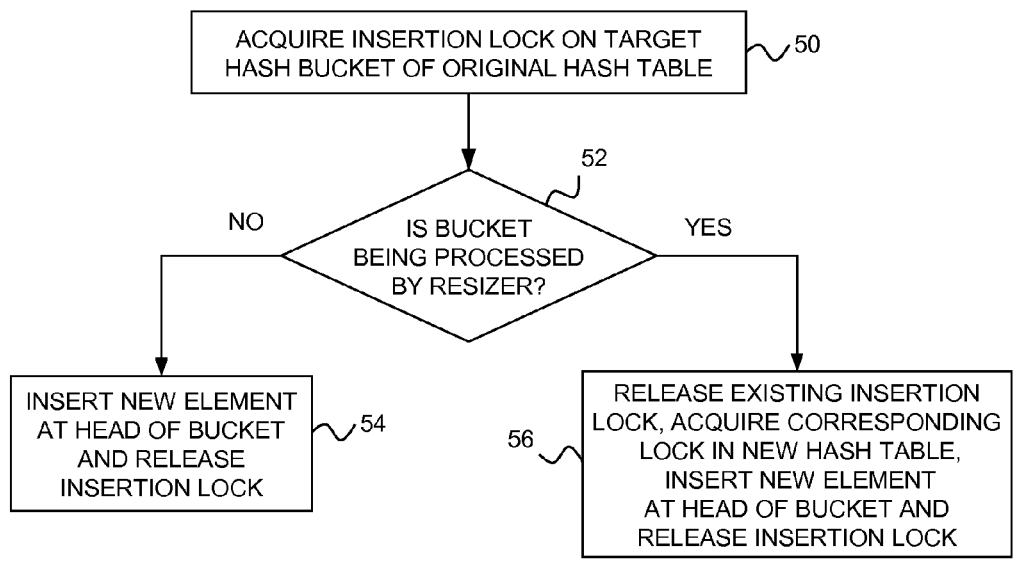
FIG. 7 is a flow diagram showing example operations for inserting a hash table element during hash table resizing.

FIG. 7 illustrates example insertion processing per the foregoing. In block 50, an insertion operation initiated during hash table resizing obtains an insertion lock on a target hash bucket in the original hash table. In block 52, the insertion operation uses one of the above techniques to determine whether the target hash bucket in the old hash table is undergoing resizing. If not, block 54 inserts the new hash table element in the target hash bucket of the old hash table and releases the insertion lock. If it is determined in block 52 that the target hash bucket in the old hash table is undergoing resizing, block 56 releases the hash bucket's insertion lock in the original hash table, acquires the corresponding insertion lock for the target bucket in the new hash table, inserts the new element at the head of this bucket, and releases the insertion lock. Optionally, block 56 may also check for new resizing operations after acquiring the target bucket's insertion lock.

Deletion while Resizing an RCU-Protected Hash Table

Figure 8A:
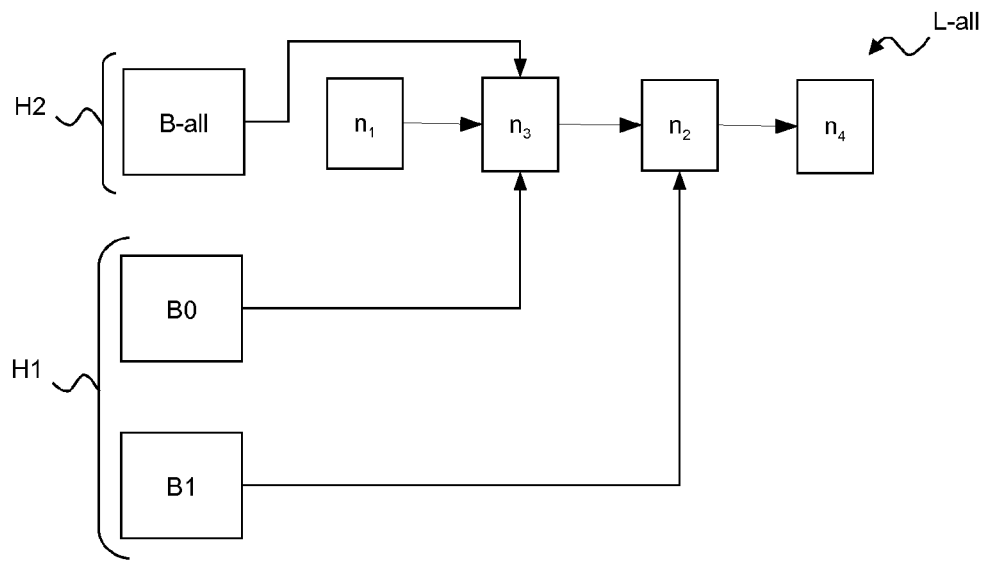
FIGS. 8A-8B are diagrammatic representations showing the effects of a hash table element deletion operation in a hash table undergoing resizing by shrinking.
Figure 8B:
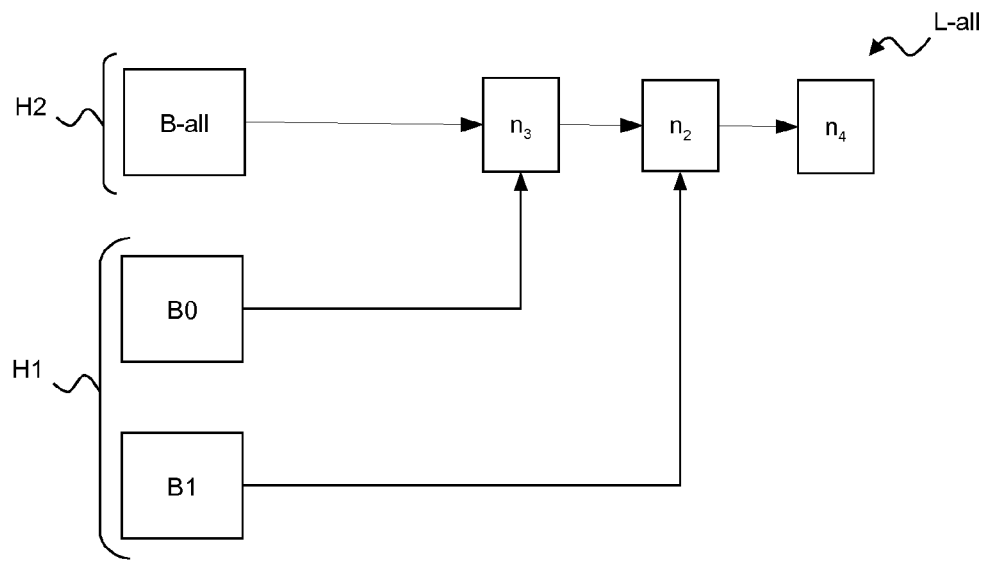
Figure 9A:
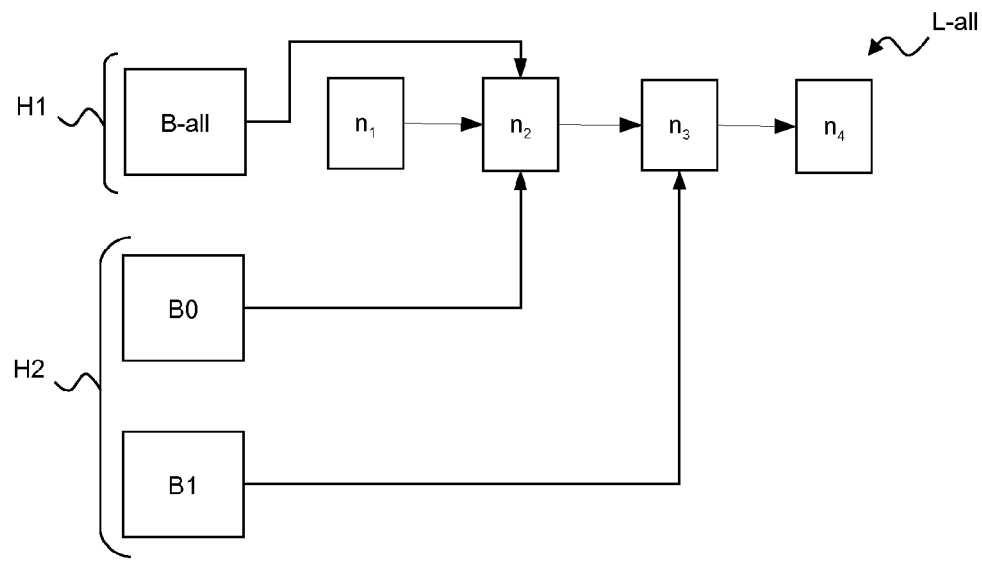
FIGS. 9A-9B are diagrammatic representations showing the effects of a hash table element deletion operation in a hash table undergoing resizing by enlarging.
Figure 9B:
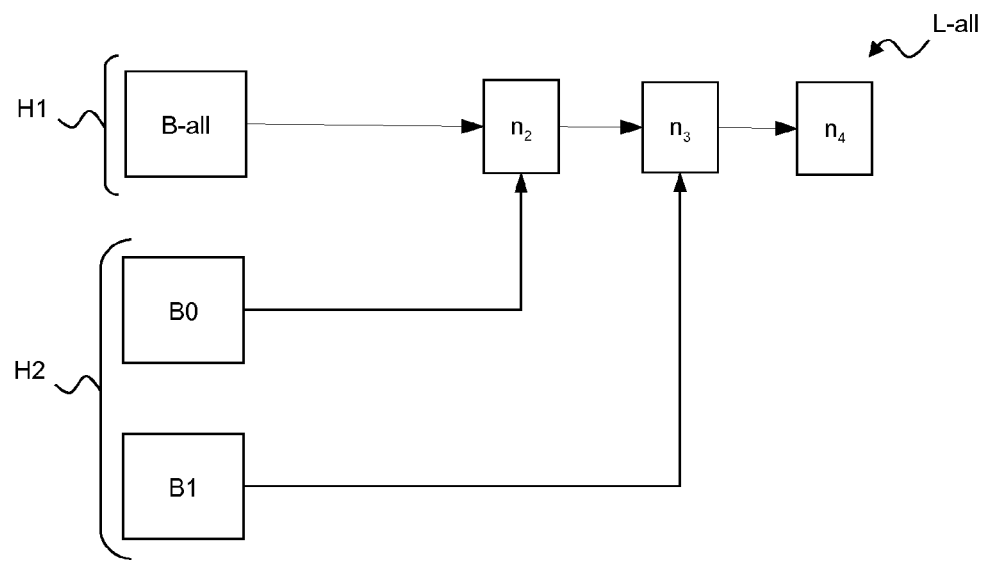

Deletion while a hash table is being resized using the above-described resizing techniques requires the removal or redirection of all pointers to the hash table element being deleted in both the original and new hash tables (including reverse pointers if the hash bucket containing the element is implemented as a doubly-linked list). This operation is performed within an RCU read-side critical section to prevent the concurrent resizing operation from freeing the original hash table while it is being referenced by the deletion operation. After exiting the RCU read-side critical section and waiting for a grace period, the deleted element may be freed. The foregoing processing presumes that the new hash table has reached the stage of being published. As discussed above, when shrinking a hash table, publication of the new hash table occurs in block 14 of FIG. 1. FIG. 2E illustrates this state with respect to a new hash table H2 having a single hash bucket B-all. FIGS. 8A and 8B show what the new and old hash tables H1 and H2 in FIG. 2E would look like as the pointers to existing element $n_1$ are redirected to element $n_3$ (FIG. 8A) and element $n_1$ is freed (FIG. 8B). When expanding a hash table, publication of the new hash table occurs in block 30 of FIG. 3A. FIG. 4D illustrates this state with respect to a new hash table H2 having two hash buckets B0 and B1. FIGS. 9A and 9B show what the new and old hash tables H1 and H2 in FIG. 4D would look like as the pointers to existing element $n_1$ are redirected to element $n_2$ (FIG. 9A) and element $n_1$ is freed (FIG. 9B). A deletion operation can be protected against concurrent deletion (or insertion) operations by a per-bucket lock. However, the deletion operation needs to be able to determine when a resizing operation is in effect so that it knows that pointers in both hash tables need to be deleted or redirected. Any of the resizing operation checking techniques disclosed above in connection with insertion operations may also be used by deletion operations. Protection against starvation by repeated resizing operations is provided by the fact that the deletion operation is implemented within an RCU read-side critical section. Additional checks may also be used, as described above in connection with insertion operations.

Figure 10:
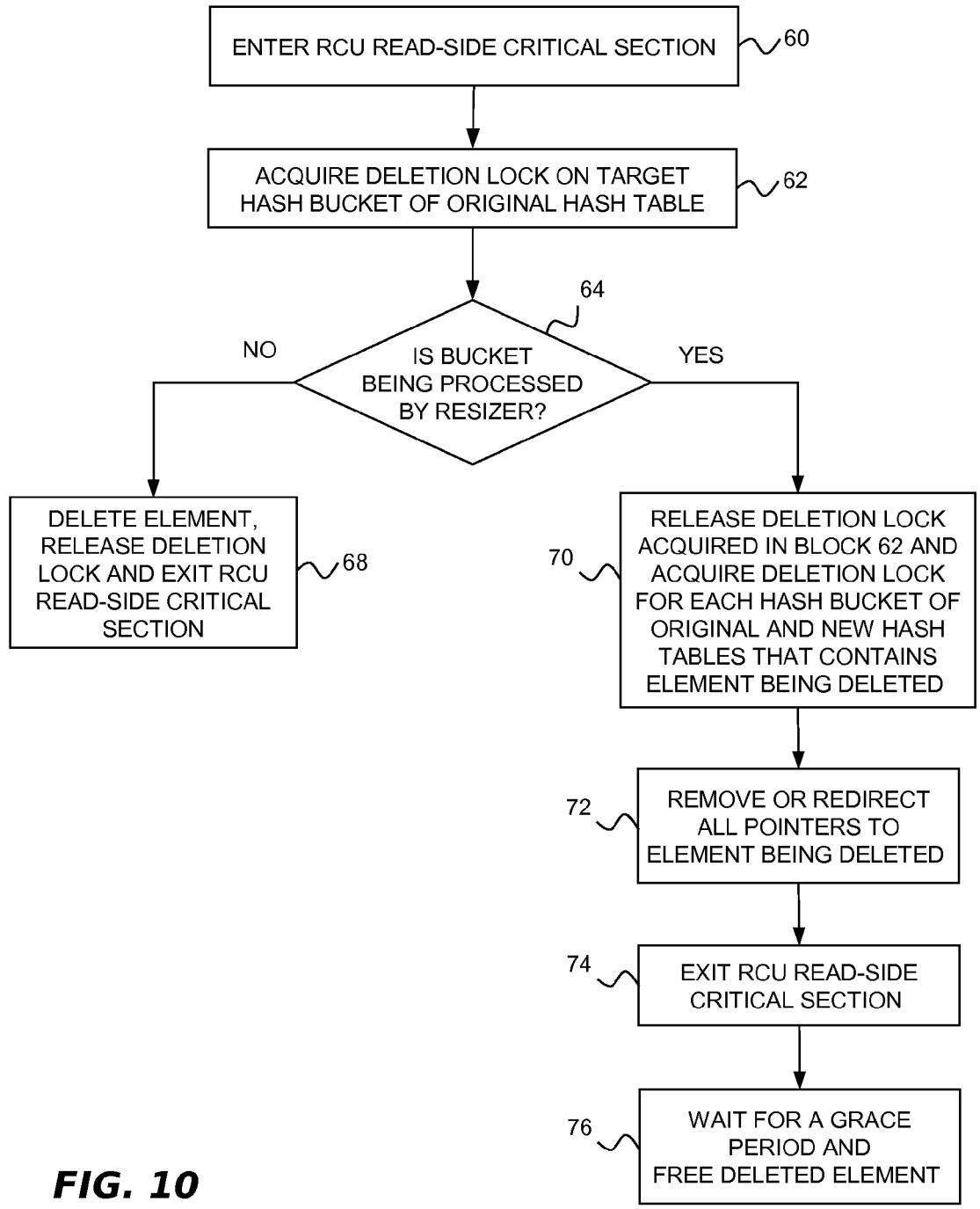
FIG. 10 is a flow diagram showing example operations for deleting a hash table element during hash table resizing.

FIG. 10 illustrates example processing that may be performed by a deletion operation in accordance with the foregoing. In block 60, the deletion operation enters an RCU read-side critical section. Block 62 acquires the deletion lock on the hash bucket in the old hash table that contains the element being deleted. Block 64 checks for a concurrent hash table resizing operation. If no such operation is in effect, block 68 deletes the item using an RCU-compliant updating technique, releases the deletion lock and exits the RCU read-side critical section. If it is determined in block 64 that the target hash bucket in the old hash table is undergoing resizing, block 70 releases the deletion lock acquired in block 62 and acquires deletion locks on all hash buckets in both the original and new hash tables that contain the element being deleted. The order of acquisition of these locks depends on the details of the resizing algorithm, but one reasonable deadlock-avoidance strategy is to first acquire the locks for the buckets in the original hash table in bucket-number order and then acquire the locks for the buckets in the new hash table, again in bucket-number order. Block 72 then removes or redirects all of the pointers in the locked buckets that reference the element being deleted. One way to do this is to start from each of the buckets locked in block 70, find all forward pointers to the element being deleted and set them all to reference the successor of the deleted element. If there is no successor, as would be the case when removing the last element of a linear bucket list, these pointers may all be set to a bucket-ending sentinel value (e.g., NULL). If the hash buckets comprise doubly-inked lists, the reverse pointer of the successor to the element being deleted will be set to reference the predecessor of the deleted element. In block 74, the deletion operation exits the RCU read-side critical section. Block 76 then waits for a grace period and frees the deleted element. The synchronize_rcu( ) primitive may be used to invoke an synchronous grace period, as could the synchronize_rcu_expedited( ) primitive if faster response time was needed. Alternatively, the call rcu( ) primitive could be invoked to implement a callback that frees the deleted element following an asynchronous grace period.

Readers

Advantageously, the foregoing resizing techniques allow readers to perform concurrent read operations during hash table resizing without incurring any significant overhead. To access an RCU-protected hash table for reading, the reader initiates an RCU read-side critical section, for example, using the rcu_read_lock( ) primitive. The only additional step required of the reader is to snapshot the original hash table pointer in case an updater replaces the pointer during the reader's lookup operation. This represents a simple fetch and store sequence to create a local copy of the pointer. Once the reader has done this, it may search the hash table in conventional fashion, as by (1) hashing the desired key, modulo the number of buckets, (2) searching for the corresponding hash bucket, (3) traversing the hash bucket's linked list, comparing each element's key to the desired key, and (4) carrying out the desired read operation on the hash table element whose key matches the desired key. Thereafter, the reader may exit the RCU read-side critical section, for example, using the rcu_read_unlock( ) primitive. In this way, readers search only one hash bucket, as required.

Example Computing Environment

Figure 11:
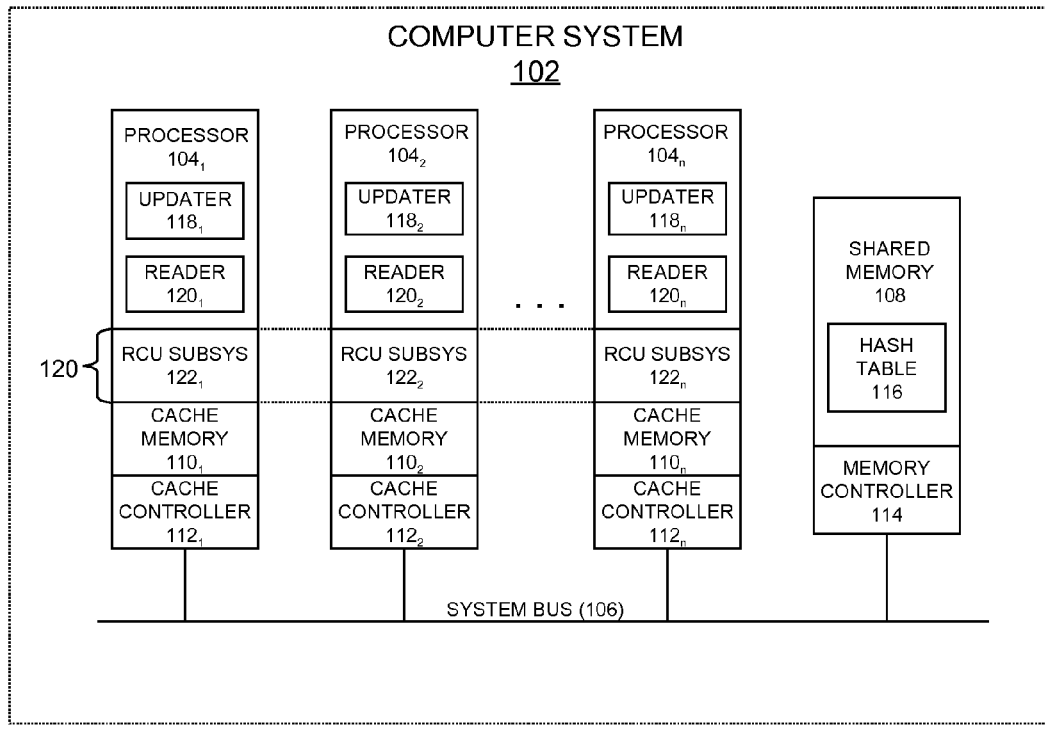
FIG. 11 is a functional block diagram showing a multiprocessor computing system that may be implemented in accordance with the present disclosure.

Turning now to the FIG. 11, an example computing environment is illustrated in which hash table resizing may be implemented. In particular, an example computer system 102 is shown in which one or more processors $104_1, 104_2 \ldots 104_n$ are operatively connected by way of a common bus 106 (or other interconnection pathway) to a shared memory 108. Respectively associated with each processor $104_1, 104_2 \ldots 104_n$ is a conventional cache memory $110_1, 110_2 \ldots 110_n$ and a cache controller $112_1, 112_2 \ldots 112_n$. A conventional memory controller 114 is associated with the shared memory 108. It stores an RCU-protected hash table 116.

The computer system 102 may represent any of several different types of computing apparatus. Examples of such apparatus include, but are not limited to, general purpose computers, special purpose computers, portable computing devices, communication and/or media player devices, set-top devices, embedded systems, and other types of information handling machines. The term "processor" as used with reference to the processors $104_1, 104_2 \ldots 104_n$ encompasses any logical execution unit capable of executing program instructions, including but not limited to a packaged integrated circuit device (such as a microprocessor), a processing core within a packaged integrated circuit device (such as a microprocessor core), or a hardware thread comprising one or more functional units within a processing core (such as an SMT thread). The processors $104_1, 104_2 \ldots 104_n$ may be situated within a single computing device or node (e.g., as part of a single-node SMP system) or they may be distributed over plural nodes (e.g., as part of a NUMA system, a cluster, or a cloud). The memory 8 may comprise any type of tangible storage medium capable of storing data in computer readable form for use in program execution, including but not limited to, any of various types of random access memory (RAM), various flavors of programmable read-only memory (PROM) (such as flash memory), and other types of primary storage (i.e., program memory). The cache memories $110_1, 110_2 \ldots 110_n$ may be implemented in several levels (e.g., as level 1, level 2 and level 3 caches) and the cache controllers $112_1, 112_2 \ldots 112_n$ may collectively represent the cache controller logic that supports each cache level. As illustrated, the memory controller 114 may reside separately from processors $104_1, 104_2 \ldots 104_n$, for example, as part of a discrete chipset. Alternatively, the memory controller 114 could be provided by plural memory controller instances that are respectively integrated with the processors $104_1, 104_2 \ldots 104_n$.

Each of the processors $104_1, 104_2 \ldots 104_n$ is operable to execute program instruction logic under the control of a software program stored in the memory 108 (or elsewhere). As part of this program execution logic, update operations (updaters) 118 will periodically execute within a process, thread, or other execution context (hereinafter "task") on the processors $104_1, 104_2 \ldots 104_n$ to perform hash table resizing and modification (e.g., insertions and deletions) on the hash table 116. Reference numerals $118_1, 118_2 \ldots 118_n$ illustrate individual updaters that may execute from time to time on the various processors $104_1, 104_2 \ldots 104_n$. Each of the processors $104_1, 104_2 \ldots 104_n$ also periodically executes read operations (readers) 120 on the hash table 116. Reference numerals $120_1, 120_2 \ldots 120_n$ illustrate individual readers that may execute from time to time on the various processors $104_1, 104_2 \ldots 104_n$. Each search operation is assumed to entail an element-by-element traversal of a bucket (implemented as a linked list) until one or more items representing the target of the search are found. In order to support concurrent hash table operations, such search operations may be performed using a lock-free synchronization mechanism, such as read-copy update. Each search operation is assumed to entail an element-by-element traversal of a bucket (implemented as an RCU-protected linked list) until one or more items representing the target of the search are found.

Figure 12:
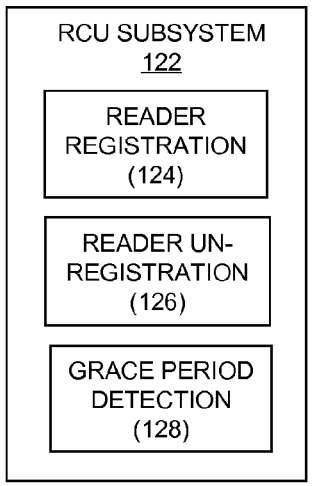
FIG. 12 is a functional block diagram showing example components of an RCU subsystem in the computer system of FIG. 11.

To facilitate synchronized updater-reader access to the hash table 116, the several processors $104_1, 104_2 \ldots 104_n$ are programmed to implement an RCU subsystem 122 by periodically executing respective RCU instances $122_1, 122_2 \ldots 122_n$ as part of their operating system functions or user-mode operations. As shown in FIG. 12, each of the read-copy update subsystem instances 122 may include a reader registration component 124, a reader un-registration component 126, and a grace period detection component 128. The reader registration component 124 is used by the readers 120 when they enter an RCU-protected critical section, such as the start of a search of the hash table 116. This component may be implemented using an RCU primitive such as rcu_read_lock( ). The reader un-registration component 126 is used by the readers 120 when they leave an RCU-protected critical section, such as at the end of a search of the hash table 116. This component may be implemented using an RCU primitive such as rcu_read_unlock( ). The grace period detection component 126 may be implemented using conventional RCU processing techniques. For example, it may provide a primitive such as synchronize_rcu( ) or synchronize_rcu_expedited( ) that can be invoked by the updaters 118 to force each of the processors $104_1, 104_2 \ldots 104_n$ to pass through a quiescent state whenever a grace period is needed. This is known as synchronous grace period detection. Other grace period detection techniques providing other semantics may also be used.

Accordingly, a technique for optimized resizing of RCU-protected hash tables has been disclosed. It will be appreciated that the foregoing concepts may be variously embodied in any of a data processing system, a machine implemented method, and a computer program product in which programming logic is provided by one or more machine-usable storage media for use in controlling a data processing system to perform the required functions. Example embodiments of a data processing system and machine implemented method were previously described in connection with FIGS. 1-12. With respect to a computer program product, digitally encoded program instructions may be stored on one or more computer-readable data storage media for use in controlling a computer or other information handling machine or device to perform the required functions. The program instructions may be embodied as machine language code that is ready for loading and execution by the machine apparatus, or the program instructions may comprise a higher level language that can be assembled, compiled or interpreted into machine language. Example languages include, but are not limited to C, C++, assembly, to name but a few. When implemented on a machine comprising a processor, the program instructions combine with the processor to provide a particular machine that operates analogously to specific logic circuits, which themselves could be used to implement the disclosed subject matter.

Figure 13:
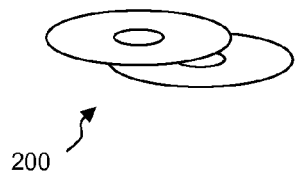
FIG. 13 is a diagrammatic illustration showing example media that may be used to provide a computer program product in accordance with the present disclosure.

Example data storage media for storing such program instructions are shown by reference numerals 108 (memory) and 110 (cache) of the computer system 102 of FIG. 11. The system 102 may further include one or more secondary (or tertiary) storage devices (not shown) that could store the program instructions between system reboots. A further example of media that may be used to store the program instructions is shown by reference numeral 200 in FIG. 13. The media 200 are illustrated as being portable optical storage disks of the type that are conventionally used for commercial software sales, such as compact disk-read only memory (CD-ROM) disks, compact disk-read/write (CD-R/W) disks, and digital versatile disks (DVDs). Such media can store the program instructions either alone or in conjunction with an operating system or other software product that incorporates the required functionality. The data storage media could also be provided by portable magnetic storage media (such as floppy disks, flash memory sticks, etc.), or magnetic storage media combined with drive systems (e.g. disk drives). As is the case with the memory 108 and the cache 110 of FIG. 11, the storage media may be incorporated in data processing platforms that have integrated random access memory (RAM), read-only memory (ROM) or other semiconductor or solid state memory. More broadly, the storage media could comprise any electronic, magnetic, optical, infrared, semiconductor system or apparatus or device, or any other tangible entity representing a machine, manufacture or composition of matter that can contain, store, communicate, or transport the program instructions for use by or in connection with an instruction execution system, apparatus or device, such as a computer. For all of the above forms of storage media, when the program instructions are loaded into and executed by an instruction execution system, apparatus or device, the resultant programmed system, apparatus or device becomes a particular machine for practicing embodiments of the method(s) and system(s) described herein.

Although various example embodiments have been shown and described, it should be apparent that many variations and alternative embodiments could be implemented in accordance with the disclosure. It is understood, therefore, that the invention is not to be in any way limited except in accordance with the spirit of the appended claims and their equivalents.

What is claimed is:

1. A system, comprising:
   one or more processors;
   a memory coupled to said one or more processors, said memory including a computer usable medium storing a first Read-Copy Update (RCU)-protected first hash table and at least one program of instructions executable by said processor to concurrently perform hash table resizing and modifying operations, said operations comprising:
   allocating a second RCU-protected hash table in said memory, said second hash table representing a resized version of said first hash table that has a different number of hash buckets than said first hash table, said second hash table buckets being defined but initially having no hash table elements;
   populating said second hash table by linking each hash bucket of said second hash table to all hash buckets of said first hash table containing elements that hash to said second hash table bucket;
   publishing said second hash table so that it is available for searching by hash table readers;

if said modifying comprises an inserting a new hash table element, inserting said new hash table element at the head of a corresponding bucket in said second hash table;

if said modifying comprises deleting an existing hash table element, entering an RCU read-side critical section, removing or redirecting all pointers in one or more hash buckets of said first hash table and said second hash table that reference said existing hash table element, exiting said RCU read-side critical section, waiting for a grace period which guarantees that no readers searching said first hash table or said second hash table will be referencing said existing hash table element, and freeing said existing hash table element from said memory; and freeing said first hash table from memory after waiting for a grace period which guarantees that no readers searching said first hash table will be affected by said freeing.

2. The system in accordance with claim 1, wherein said modifying includes first determining whether said resizing is underway, and if not, performing said modifying on said first hash table only.

3. The system in accordance with claim 2, wherein said determining is performed after acquiring a lock on a hash bucket in said first hash table where said modifying is to be performed, and releasing said first lock if said resizing is determined to be underway.

4. The system in accordance with claim 2, wherein said modifying comprises inserting a new hash table element, and wherein a lock is acquired on a hash bucket in said second hash table where said inserting is to be performed.

5. The system in accordance with claim 2 wherein said modifying comprises deleting an existing hash table element, and wherein locks are acquired on all hash buckets in said first hash table, and said second hash table where said pointer removing or redirecting is to be performed.

6. The system in accordance with claim 1, wherein said modifying further includes performing an action to prevent starvation by successive invocations of said resizing.

7. A computer program product, comprising:
one or more non-transitory machine-usable storage media;
program instructions provided by said one or more media for programming a data processing platform having one or more processors operatively coupled to a memory to concurrently perform hash table resizing and modifying operations, said memory storing a first Read-Copy Update (RCU)-protected hash table, and said operations comprising:
allocating a second RCU-protected hash table in said memory, said second hash table representing a resized version of said first hash table that has a different number of hash buckets than said first hash table, said second hash table buckets being defined but initially having no hash table elements;
populating said second hash table by linking each hash bucket of said second hash table to all hash buckets of said first hash table containing elements that hash to said second hash table bucket;
publishing said second hash table so that it is available for searching by hash table readers;
if said modifying comprises an inserting a new hash table element, inserting said new hash table element at the head of a corresponding bucket in said second hash table;
if said modifying comprises deleting an existing hash table element, entering an RCU read-side critical section, removing or redirecting all pointers in one or more hash buckets of said first hash table and said second hash table that reference said existing hash table element, exiting said RCU read-side critical section, waiting for a grace period which guarantees that no readers searching said first hash table or said second hash table will be referencing said existing hash table element, and freeing said existing hash table element from said memory; and
freeing said first hash table from memory after waiting for a grace period which guarantees that no readers searching said first hash table will be affected by said freeing.

8. The computer program product in accordance with claim 7, wherein said modifying includes first determining whether said resizing is underway, and if not, performing said modifying on said first hash table only.

9. The computer program product in accordance with claim 8, wherein said determining is performed after acquiring a lock on a hash bucket in said first hash table where said modifying is to be performed, and releasing said first lock if said resizing is determined to be underway.

10. The computer program product in accordance with claim 8, wherein said modifying comprises inserting a new hash table element, and wherein a lock is acquired on a hash bucket in said second hash table where said inserting is to be performed.

11. The computer program product in accordance with claim 8 wherein said modifying comprises deleting an existing hash table element, and wherein locks are acquired on all hash buckets in said first hash table and said second hash table where said pointer removing or redirecting is to be performed.

12. The computer program product in accordance with claim 7, wherein said modifying further includes performing an action to prevent starvation by successive invocations of said resizing.

* * * * *